US011976642B2

(12) United States Patent
Ziemba et al.

(10) Patent No.: US 11,976,642 B2
(45) Date of Patent: *May 7, 2024

(54) LOW PRESSURE DIELECTRIC BARRIER DISCHARGE PLASMA THRUSTER

(71) Applicant: Eagle Harbor Technologies, Inc., Seattle, WA (US)

(72) Inventors: Timothy M. Ziemba, Bainbridge Island, WA (US); James R. Prager, Seattle, WA (US); John G. Carscadden, Seattle, WA (US); Kenneth E. Miller, Seattle, WA (US); Ilia Slobodov, Seattle, WA (US); Julian F. Picard, Seattle, WA (US); Akel Hashim, Yelm, WA (US)

(73) Assignee: EHT Ventures LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,849

(22) Filed: Dec. 22, 2022

(65) Prior Publication Data

US 2023/0184232 A1 Jun. 15, 2023

Related U.S. Application Data

(63) Continuation of application No. 15/146,615, filed on May 4, 2016, now Pat. No. 11,542,927.

(Continued)

(51) Int. Cl.

| | |
|---|---|
| ***F03H 1/00*** | (2006.01) |
| ***H05H 1/24*** | (2006.01) |
| ***H05H 1/54*** | (2006.01) |

(52) U.S. Cl.

CPC ......... *F03H 1/0087* (2013.01); *H05H 1/2406* (2013.01); *H05H 1/54* (2013.01); *H05H 1/2465* (2021.05)

(58) Field of Classification Search

CPC ................. F03H 1/0006; F03H 1/0018; F03H 1/0037–0081; F03H 1/0087;

(Continued)

(56) References Cited

U.S. PATENT DOCUMENTS

| | | | |
|---|---|---|---|
| 5,313,481 | A | 5/1994 | Cook et al. |
| 5,317,155 | A | 5/1994 | King |

(Continued)

FOREIGN PATENT DOCUMENTS

| | | | |
|---|---|---|---|
| EP | 0947048 | A1 | 10/1999 |
| EP | 1515430 | A1 | 3/2005 |
| WO | 1997034449 | A1 | 9/1997 |

OTHER PUBLICATIONS

Akagi "A Voltage Source Inverter Using IGBT's for 50khz 10kv Corona Surface Treater" (Year: 1989).*

(Continued)

*Primary Examiner* — Arun Goyal
*Assistant Examiner* — William L Breazeal

(57) ABSTRACT

Some embodiments of the invention include a thruster system comprising a thruster and a pulsing power supply. The thruster may include a gas inlet port; a plasma jet outlet; and a first electrode. In some embodiments, the pulsing power supply may provide an electrical potential to the first electrode with a pulse repetition frequency greater than 10 kHz, a voltage greater than 5 kilovolts. In some embodiments, the pressure downstream from the thruster can be less than 10 Torr. In some embodiments, when a plasma is produced within the thruster by energizing a gas flowing into the thruster through the gas inlet port, the plasma is expelled from the thruster through the plasma jet outlet.

20 Claims, 11 Drawing Sheets

Related U.S. Application Data

(60) Provisional application No. 62/156,710, filed on May 4, 2015.

(58) Field of Classification Search
CPC H01J 37/32348; H01J 37/32009; H05H 1/46; H05H 2001/4682; A61L 2/0011; A61L 9/22; A61L 2/14
See application file for complete search history.

(56) References Cited

U.S. PATENT DOCUMENTS

| | | | | |
|---|---|---|---|---|
| 5,321,597 | A | 6/1994 | Alacoque | |
| 5,392,043 | A | 2/1995 | Ribner | |
| 5,808,504 | A | 9/1998 | Chikai et al. | |
| 6,359,542 | B1 | 3/2002 | Widmayer et al. | |
| 6,577,135 | B1 | 6/2003 | Matthews et al. | |
| 6,741,120 | B1 | 5/2004 | Tan | |
| 6,741,484 | B2 | 5/2004 | Crewson et al. | |
| 6,831,377 | B2 | 12/2004 | Yampolsky et al. | |
| 6,897,574 | B2 | 5/2005 | Vaysse | |
| 7,061,230 | B2 | 6/2006 | Kleine et al. | |
| 7,180,082 | B1 | 2/2007 | Hassanein et al. | |
| 7,307,375 | B2 | 12/2007 | Smith et al. | |
| 7,319,579 | B2 | 1/2008 | Inoue et al. | |
| 7,492,138 | B2 | 2/2009 | Zhang et al. | |
| 7,605,385 | B2 | 10/2009 | Bauer | |
| 7,901,930 | B2 | 3/2011 | Kuthi et al. | |
| 7,948,185 | B2 | 5/2011 | Smith et al. | |
| 8,093,979 | B2 | 1/2012 | Wilson | |
| 8,115,343 | B2 | 2/2012 | Sanders et al. | |
| 8,143,790 | B2 | 3/2012 | Smith et al. | |
| 8,723,591 | B2 | 5/2014 | Lee et al. | |
| 8,773,184 | B1 | 7/2014 | Petrov et al. | |
| 8,963,377 | B2 | 2/2015 | Ziemba et al. | |
| 9,329,256 | B2 | 5/2016 | Dolce | |
| 11,542,927 | B2 * | 1/2023 | Ziemba | H05H 1/54 |
| 2001/0008552 | A1 | 7/2001 | Harada et al. | |
| 2003/0169107 | A1 | 9/2003 | LeChevalier | |
| 2006/0210020 | A1 | 9/2006 | Takahashi et al. | |
| 2007/0018504 | A1 | 1/2007 | Wiener et al. | |
| 2007/0115705 | A1 | 5/2007 | Gotzenberger et al. | |
| 2008/0062733 | A1 | 3/2008 | Gay | |
| 2008/0143260 | A1 | 6/2008 | Tuymer et al. | |
| 2008/0198634 | A1 | 8/2008 | Scheel et al. | |
| 2010/0007358 | A1 | 1/2010 | Schaerrer et al. | |
| 2010/0284208 | A1 | 11/2010 | Nguyen et al. | |
| 2012/0155613 | A1 | 6/2012 | Caiafa et al. | |
| 2012/0304618 | A1 | 12/2012 | Roy | |
| 2013/0113650 | A1 | 5/2013 | Behbahani et al. | |
| 2013/0175405 | A1 * | 7/2013 | Khozikov | F03H 1/0037 315/111.21 |
| 2014/0109886 | A1 | 4/2014 | Singleton et al. | |
| 2014/0146571 | A1 | 5/2014 | Ryoo et al. | |
| 2014/0268968 | A1 | 9/2014 | Richardson | |
| 2014/0354343 | A1 | 12/2014 | Ziemba et al. | |
| 2015/0028932 | A1 | 1/2015 | Ziemba et al. | |
| 2015/0076372 | A1 | 3/2015 | Ziemba et al. | |
| 2015/0130525 | A1 | 5/2015 | Miller et al. | |
| 2015/0256086 | A1 | 9/2015 | Miller et al. | |
| 2015/0303914 | A1 | 10/2015 | Ziemba et al. | |
| 2015/0318846 | A1 | 11/2015 | Prager et al. | |

OTHER PUBLICATIONS

Lawless "Characteristics of a Fast Rise Time Power Supply for a Pulsed Plasma Reactor for Chemical Vapor Deposition" (Year: 1996).*

Campbell "A High Voltage Nanosecond Pulse Generator" (Year: 2008).*

Bland, M.J., et al., "A High Power RF Power Supply for High Energy Physics Applications," Proceedings of 2005 the Particle Accelerator Conference, IEEE pp. 4018-4020 (May 16-20, 2005).

Blom, P.P.M., "High Power Pulsed Corona" pp. 1-134 (Year: 1997).

Dammertz, G., et al., "Development of Multimegawatt Gyrotrons for Fusion Plasma Heating and current Drive," IEEE Transactions on Electron Devices, vol. 52, No. 5, pp. 808-817 (May 2005).

Ferry, J. W., "Thrust Measurement of Dielectric Barrier Discharge Plasma Actuators and Power Requirements for Aerodynamic Control" pp. 1-57 (2010).

Garwin, R., "Pulsed Power Peer Review Committee Report," Sandia National Laboratories Report, SAND2000-2515, pp. 3-38 (Oct. 2000).

Gaudet, J.A., et al., "Research issues in Developing Compact Pulsed Power for High Peak Power Applications on Mobile Platforms," Proceedings of the IEEE, vol. 92, No. 7, pp. 1144-1165 (Jul. 2004).

In, Y., et al., "On the roles of direct feedback and error field correction in stabilizing resistive-wall modes," Nuclear 2 Fusion, vol. 50, No. 4, pp. 1-5 (2010).

Kim, J.H., et al., "High Voltage Pulsed Power Supply Using IGBT Stacks," IEEE Transactions on Dielectrics and Electrical insulation, vol. 14, No. 4, pp. 921-926 (Aug. 2007).

Locher, R., "Introduction to Power MOSFETs and their Applications (Application Note 558)," Fairchild Semiconductor, 15 pages (Oct. 1998).

Locher, R.E., and Pathak, A.D., "Use of BiMOSFETs in Modern Radar Transmitters," IEEE International Conference on Power Electronics and Drive Systems, pp. 776-782 (2001).

Reass, W.A., et al., "Progress Towards a 20 KV, 2 KA Plasma Source Ion Implantation Modulator for Automotive Production of Diamond Film on Aluminum," Submitted to 22nd International Power Symposium, Boca Raton, FL, 6 pages (Jun. 24-27, 1996).

Sanders, J.M., et al., "Scalable, compact, nanosecond pulse generator with a high repetition rate for biomedical applications requiring intense electric fields," 2009 IEEE Pulsed Power Conference, Washington, DC, 2 pages (Jun. 28, 2009-Jul. 2, 2009).

Schamiloglu, E., et al., "Scanning the Technology: Modem Pulsed Power: Charlie Martin and Beyond," Proceedings of the IEEE, vol. 92, No. 7 , pp. 1014-1020 (Jul. 2004).

Scoville, J.T., et al., "The Resistive Wall Mode Feedback Control System on DIII-D," IEEE/NPSS 18th Symposium on fusion Engineering, Albuquerque, NM, Oct. 25-29, 1999, General Atomics Report GAA23256, 7 pages (Nov. 1999).

Starikovskiy, A. and Aleksandrov, N., "Plasma-assisted ignition and combustion," Progress in Energy and Combustion Science, vol. 39, No. 1, pp. 61-110 (Feb. 2013).

Singleton, D.R., et al. "Compact Pulsed-Power System for Transient Plasma Ignition," IEEE Transactions on Plasma Science, vol. 37, No. 12, pp. 2275-2279 (2009).

Singleton, D.R., et al., "Low Energy Compact Power Modulators for Transient Plasma Ignition," IEEE Transactions on Dielectrics and Electrical Insulation, vol. 18, No. 4, pp. 1084-1090 (Aug. 2011).

Rao, X., et al., "Combustion Dynamics of Plasma-Enhanced Premixed and Nonpremixed Flames," IEEE Transactions on Plasma Science, vol. 38, No. 12, pp. 3265-3271 (Dec. 2010).

Pokryvailo, A., et al., "A 1KW Pulsed Corona System for Pollution Control Applications," 14th IEEE International Pulsed Power Conference, Dallas, TX, USA (Jun. 15-18, 2003).

Pokryvailo, A., et al., "High-Power Pulsed Corona for Treatment of Pollutants in Heterogeneous Media," IEEE Transactions on Plasma Science, vol. 34, No. 5, pp. 1731-1743 (Oct. 2006).

Wang, F., et al., "Compact High Repetition Rate Pseudospark Pulse Generator," IEEE Transactions on Plasma Science, vol. 33, No. 4, pp. 1177-1181 (Aug. 2005).

Zavadtsev, D.A., et al., "Compact Electron Linear Accelerator RELUS-5 for Radiation Technology Application," 10th European Particle Accelerator Conference, Edinburgh, UK, pp. 2385-2387 (Jun. 26-30, 2006).

Zhu, Z., et al., "High Voltage pulser with a fast fall-time for plasma immersion ion implantation," Review of Scientific Instruments, vol. 82, No. 4, pp. 045102-1-045102-4 (Apr. 2011).

International Search Report and Written Opinion as issued in connection with International Patent Application No. PCT/US2014/040929, dated Sep. 15, 2014, 12 pages.

International Search Report and Written Opinion as issued in connection with International Patent Application No. PCT/US2014/065832, dated Feb. 20, 2015, 14 pages.

(56) References Cited

OTHER PUBLICATIONS

International Search Report and Written Opinion as issued in connection with International Patent Application No. PCT/US2015/018349, dated Jul. 14, 2015, 11 pages.
International Search Report and Written Opinion as issued in connection with International Patent Application No. PCT/US2015/040204, dated Oct. 6, 2015, 15 pages.
Non-Final Office Action in U.S. Appl. No. 15/146,615 dated Mar. 6, 2019, 20 pages.
Non-Final Office Action in U.S. Appl. No. 15/146,615 dated Sep. 24, 2019, 23 pages.
Final Office Action in U.S. Appl. No. 15/146,615 dated Jun. 1, 2020, 26 pages.
Notice of Allowance in U.S. Appl. No. 15/146,615 dated Jul. 25, 2022, 8 pages.

* cited by examiner

LOW PRESSURE DIELECTRIC BARRIER DISCHARGE PLASMA THRUSTER

CROSS-REFERENCE TO RELATED APPLICATION

This application is a non-provisional of U.S. Provisional Patent Application No. 62/156,710, filed May 4, 2015, titled PULSER DRIVEN THRUSTER.

SUMMARY

Some embodiments of the invention include a thruster system comprising a thruster and a pulsing power supply. The thruster may include a gas inlet port; a plasma jet outlet; and a first electrode. In some embodiments, the pulsing power supply may provide an electrical potential to the first electrode with a pulse repetition frequency greater than 10 kHz, a voltage greater than 5 kilovolts. In some embodiments, the gas pressure downstream of the thruster of less than 10 Torr. In some embodiments, when a plasma is produced within the thruster by energizing a gas flowing into the thruster through the gas inlet port, the plasma is expelled from the thruster through the plasma jet outlet.

In some embodiments, the pulsing power supply may include a plurality of IGBTs and a transformer. In some embodiments, the pulsing power supply may have an inductance less than 100 nH. In some embodiments, the pulsing power supply may have a capacitance less than 100 pF. In some embodiments, the pulsing power supply may be a solid state pulsing power supply. In some embodiments, the pulsing power supply may be configured to produce variable and/or controllable pulse widths between 20 ns and 500 ns.

In some embodiments, the pulse width of the electrical potential are variable. In some embodiments, the thruster comprises a thruster selected from a group consisting of a dielectric free electrode thruster, a dielectric barrier discharge device, a dielectric barrier discharge-like device, and a single electrode thruster. In some embodiments, the pulsing power supply comprises a dielectric tube In some embodiments, the first electrode comprises a ring electrode. In some embodiments, a second ring electrode electrically coupled with the pulsing power supply. In some embodiments, the first electrode comprises a tube electrode. In some embodiments, the pulsing power supply comprises: a dielectric tube having a gas inlet and a jet outlet; and two ring electrodes surrounding the dielectric tube, wherein the two ring electrodes are electrically coupled with the pulsing power supply. In some embodiments, the pulsing power supply produces a plasma at input propellant flow rates of less than 500 SCCM.

BRIEF DESCRIPTION OF THE FIGURES

These and other features, aspects, and advantages of the present disclosure are better understood when the following is read with reference to the accompanying drawings.

DETAILED DESCRIPTION

Figure 1A:
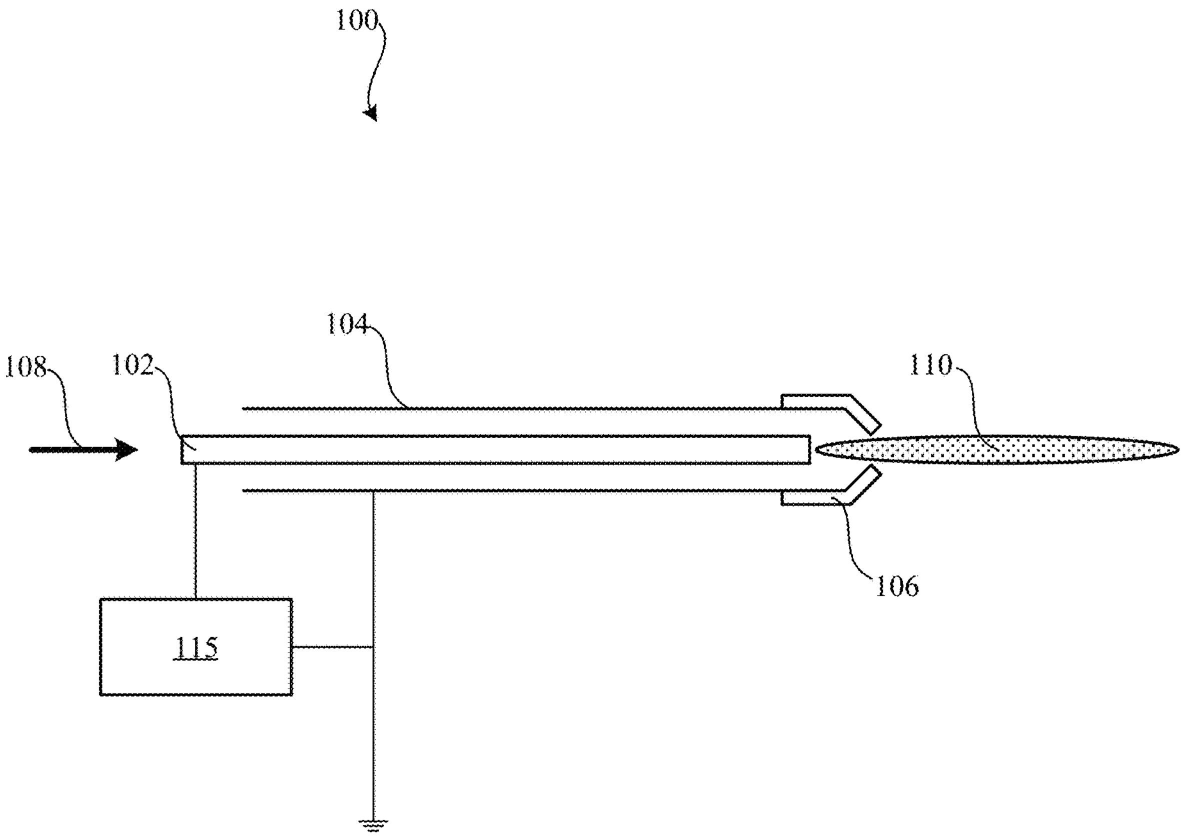
FIG. 1A illustrates a block diagram of a dielectric free electrode jet device according to some embodiments.

Systems and methods are disclosed that include a thruster system that may include thruster (e.g., a plasma jet, an electric propulsion device, or a dielectric barrier discharge device) electrically coupled with a pulsing power supply. A gas may be introduced into the thruster with a low flow rate (e.g., less than about 1,000 SCCM) and/or a low downstream pressure (e.g., less than about 1.0 Torr) within the thruster. A pulsing electrical potential may be created by the pulsing power supply within the gas. The pulsing electrical potential, for example, may have a high voltage (e.g., greater than about 5 kV or between about 1 kV—20 kV), a high pulse repetition frequency (e.g., greater than about 20 kHz or between 0 and 100 kHz), a short rise time (e.g., less than about 50 ns or between 1 ns and 50 ns), a short pulse width (e.g., less than about 200 ns or between 20 ns and 500 ns), etc. The pulsing power supply may also produce a current of about 125 A or between 50 A and 200 A. The pulsing power supply, for example, may have an inductance less than 100 nH and/or a capacitance less than 100 pF.

Some embodiments may include a thruster that includes a pulsing power supply (or a pulser) that can produce a thruster plasma with low flow rates. In some embodiments, such a system may include a pulsing power supply coupled with one or more electrodes of the thruster. In some embodiments, such a thruster may produce an electric potential with a voltage greater than 5 kV, a pressure less than 10 Torr, a fast rise time of less than 100 ns, a short pulse width of less than about 500 ns (or a less than about 100 ns).

In some embodiments, the thruster system may include a low mass and/or a low volume fraction. In some embodiments, the thruster may be scalable to any size of satellites. In some embodiments, the thruster may operate with a wide range voltage capability to provide an exit speed of hundreds or even thousands of m/s. In some embodiments, the thruster may be operable with a wide range of specific impulse capability such as, for example, of 3,000 seconds or more. In some embodiments, the thruster may be operable with substantially precise thrust vectoring. In some embodiments, the thruster may be efficient. In some embodiments, the thruster may have a high power efficiency. In some embodiments, the thruster may include a simplified thermal and/or simplified propellant management. In some embodiments, the thruster may be used in medical devices, material science, aerodynamic actuators, and/or UV light production.

In some embodiments, the thruster system may include a dielectric barrier discharge device. A dielectric barrier discharge device, for example, may be used for atmospheric and low-temperature plasma production. Dielectric barrier discharge devices, for example, have been shown to be an efficient method for producing low-temperature plasmas.

In some embodiments, a dielectric barrier discharge device can have an efficiency of over 50%. In some embodiments, a dielectric barrier discharge device may be operated in propellant flow regimes where plasma production is low (~1%) making the thruster an electro-thermal type of thruster with lower specific impulse but reasonable thrust levels suited for satellite maneuvering and station keeping. Higher thrust systems suitable for larger nanosats can be envisioned with scaling to very large dielectric barrier discharge arrays, which is certainly an option with current micro-manufacturing technologies.

Some embodiments may include a thruster system that includes a solid-state pulsing power supply coupled with a dielectric barrier discharge device.

In some embodiments, the thruster system may have a low mass and/or a low volume fraction. In some embodiments, the low mass and/or low volume fractions may be scalable to small and very small satellites. In some embodiments, the thruster system may be used in UV production systems.

In some embodiments, the thruster system may include a pulsing power supply that can produce a wide range of voltages that can produce plasma or propellant velocities of hundreds or thousands of m/s.

In some embodiments, the thruster system may include a wide range of specific impulse capability such as, for example, up to thousands of seconds.

In some embodiments, the thruster system may include precise thrust vectoring and/or low vibration for precision maneuvering. For example, the thruster system may have a high power efficiency, a simplified thermal management, and/or a simplified propellant management.

In some embodiments, a thruster system may be used for a small satellite propulsion system. In some embodiments, a thruster system may have high propellant flow rates for high thrust applications that may, for example, be used at higher power levels suitable for large nanosats. In some embodiments, a thruster system may operate with very low flow rates and/or may produce plasmas with similar qualities as high specific impulse electric propulsion thruster systems.

Many small-area dielectric barrier discharge devices may have capacitance that is less than 10 pF, yet such small-area dielectric barrier discharge devices may not produce sufficient thrust for large satellites such as, for example, for spacecraft sizes beyond a CubeSat. In order to increase the thrust in such a small-area dielectric barrier discharge device the capacitance will be increased. For example, the capacitance can grow to over 100 pF. If, for example, the dielectric barrier discharge device is operated at 5 kV, which, for example, may be required for larger gap distances, then 20 mJ may be required per pulse to fully charge the dielectric barrier discharge capacitance. Faster voltage rise-times on the order of 10 to 100 ns have demonstrated peak performance; therefore, peak power levels that must be delivered from the pulsing power supply may very large on the order of 0.2 to 2 MW. However, the average power to the load is only 200 W for 10 kHz pulse repetition frequency (PRF) or 20 W for 1 kHz operation. Thus, the peak power of a short pulse width and high PRF of jets can be very demanding on the power system necessary to drive dielectric barrier discharge devices even of moderate capacitances and options for these supplies have been very limited.

Some embodiments may include a pulsing power supply that can, for example, meet these demanding specifications for dielectric barrier discharge loads. In some embodiments, the pulsing power supply may provide high voltages at high pulse repetition frequencies. In some embodiments, the pulsing power supply may provide high voltages with fast rise times. In some embodiments, such a pulsing power supply may be highly controllable. In some embodiments, such a pulsing power supply may be a high voltage pulsing power supply that may be designed to produce non-equilibrium plasmas like pseudosparks and/or dielectric barrier discharge devices. In some embodiments, the output voltage, pulse width (PW), and/or PRF may be adjustable such as, for example, using front panel controls or remote controls. This versatile pulsing power supply may allow for plasma parameters to be dialed in to a specific application and/or may allow for the exploration of a wide range of plasma parameters. In some embodiments, such a pulsing power supply may be capable of continuous operation with one or more of the following parameters: controllable pulse widths (e.g., 20-500 ns and/or less than 100 ns), adjustable high pulse repetition frequency (e.g., 5 kHz-100 kHz), independently variable output voltage (e.g., 0-100 kV), current output: 0-100 A, etc.

FIG. 1A illustrates a block diagram of a thruster system 100 according to some embodiments. The dielectric free electrode jet 100 may include an internal electrode 102, a tube electrode 104, a nozzle 106, and a gas inlet port 108. The gas inlet port 108 may introduce gas into the dielectric free electrode jet 100 that can be ionized creating a plasma 110. The gas inlet port may introduce gas at various flow rates such as, for example, a flow rate less than 100 SCCM, 50 SCCM, 25 SCCM, 15 SCCM, 10 SCCM, 5 SCCM, etc.

The pulsing power supply 115 may be electrically coupled with the internal electrode 102 and the tube electrode 104. An electrical potential may be produced between internal electrode 102 and the tube electrode 104. This electrical potential, for example, may create the plasma 110 by ionizing the gas introduced through the gas inlet port 108.

Figure 1B:
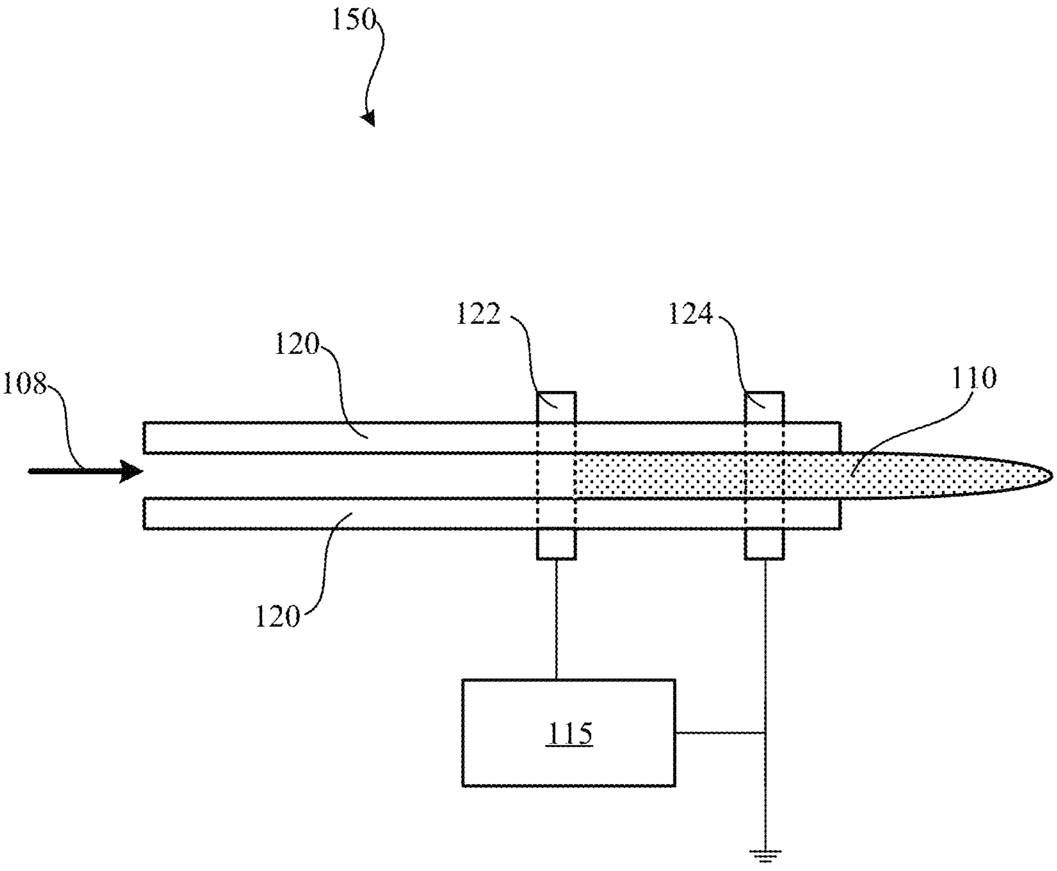
FIG. 1B illustrates a block diagram of a dielectric barrier-like atmospheric pressure plasma jet device.

FIG. 1B illustrates a block diagram of a thruster system 150 according to some embodiments. The dielectric barrier discharge pressure plasma jet device may include, for example, the gas inlet port 108, a dielectric tube 120, a first ring electrode 122, and a second electrode 124. The gas inlet port 108 may introduce gas into the dielectric tube 120. Once the gas is within the dielectric tube 120, the gas can be ionized by an electric potential created between the first ring electrode 122 and the second electrode 124 creating the plasma 110. The gas inlet port may introduce gas at various flow rates such as, for example, a flow rate less than 100 SCCM, 50 SCCM, 25 SCCM, 15 SCCM, 10 SCCM, 5 SCCM, etc. The plasma 110 may exit the dielectric tube 120 via a plasma jet outlet.

The pulsing power supply 115 may be electrically coupled with the first ring electrode 122 and the second electrode 124. An electrical potential may be produced the first ring electrode 122 and the second electrode 124. This electrical potential, for example, may create the plasma 110 by ionizing the gas introduced through the gas inlet port 108.

Figure 1C:
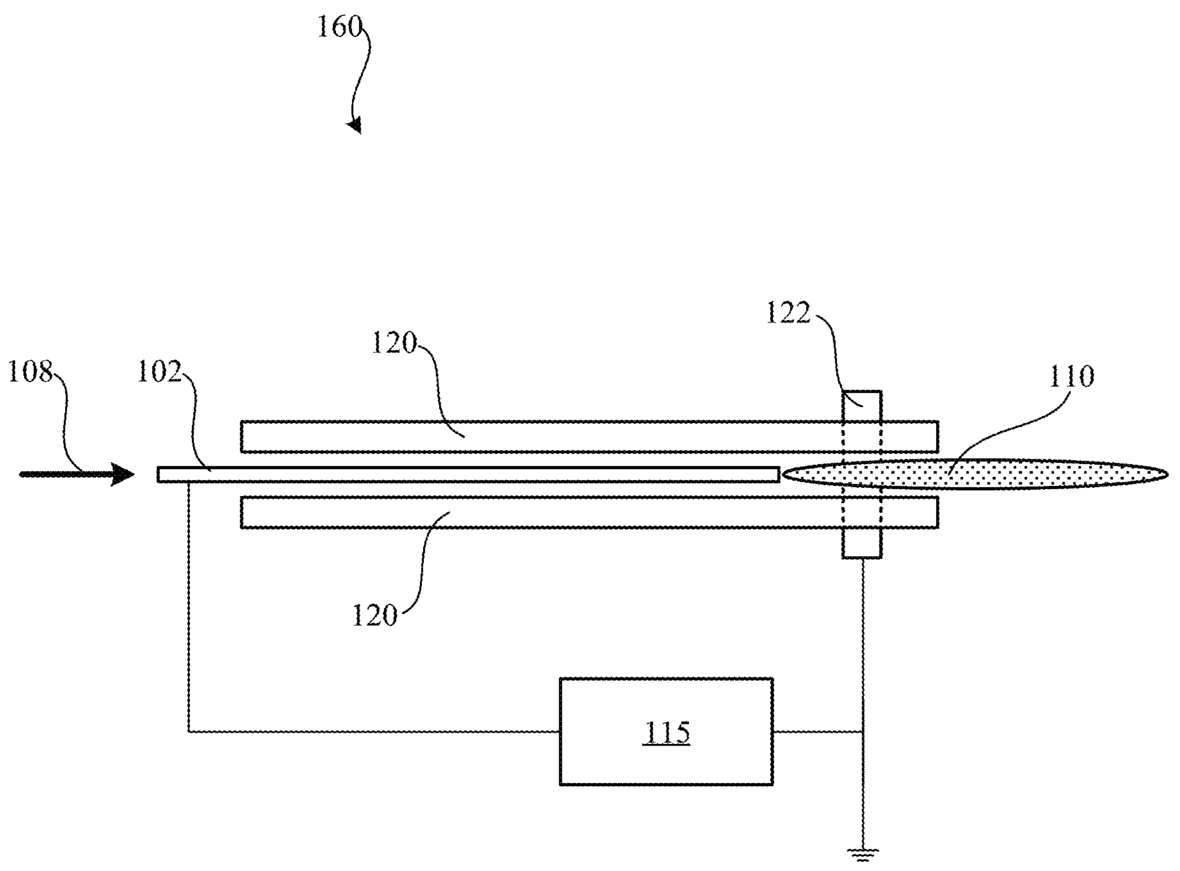
FIG. 1C illustrates a block diagram of a dielectric barrier discharge-like device according to some embodiments.

FIG. 1C illustrates a block diagram of a thruster system 160 according to some embodiments. The dielectric barrier discharge-like device 160 may include, for example, the gas inlet port 108, a dielectric tube 120, a first ring electrode 122, and an internal electrode 102. The internal electrode 102 may extend longitudinally into the dielectric tube 120. The gas inlet port 108 may introduce gas into the dielectric tube 120, the gas can be ionized by an electric potential created between the first ring electrode 122 and the internal electrode 102 creating the plasma 110. The gas inlet port may introduce gas at various flow rates such as, for example, a flow rate less than 100 SCCM, 50 SCCM, 25 SCCM, 15 SCCM, 10 SCCM, 5 SCCM, etc. The plasma 110 may exit the dielectric tube 120 via a plasma jet outlet.

The pulsing power supply 115 may be electrically coupled with the first ring electrode 122 and the internal electrode 102. An electrical potential may be produced the first ring electrode 122 and the internal electrode 124. This electrical potential, for example, may create the plasma 110 by ionizing the gas introduced through the gas inlet port 108.

Figure 1D:
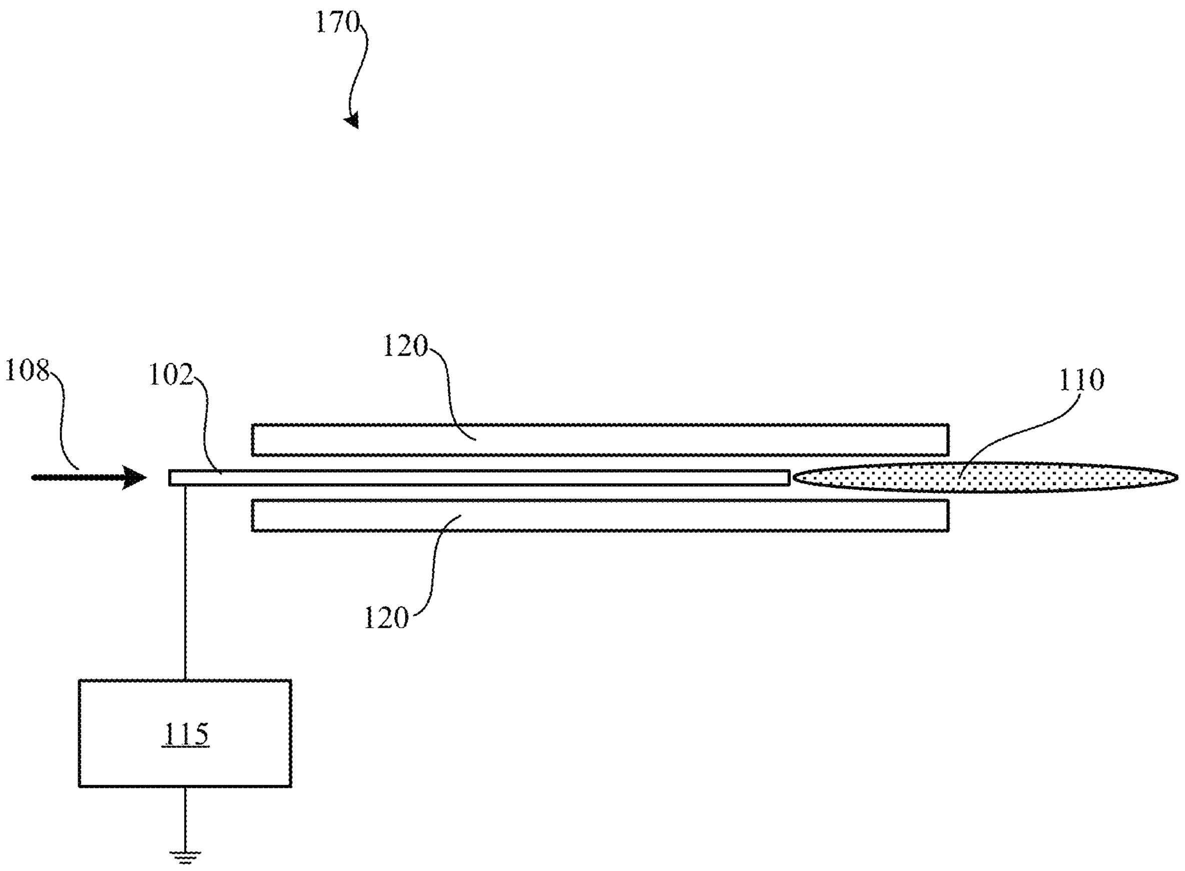
FIG. 1D illustrates single electrode jet device according to some embodiments.

FIG. 1D illustrates a block diagram of a thruster system 170 according to some embodiments. In some embodiments, the single electrode jet 170 may include, for example, the gas inlet port 108, a dielectric tube 120, and an internal electrode 102. The internal electrode 102 may extend longitudinally into the dielectric tube 120. The gas inlet port 108 may introduce gas into the dielectric tube 120, the gas can be ionized by an electric potential created between the internal electrode 102 and ground potential creating the plasma 110. The gas inlet port may introduce gas at various flow rates such as, for example, a flow rate less than 100 SCCM, 50 SCCM, 25 SCCM, 15 SCCM, 10 SCCM, 5 SCCM, etc. The plasma 110 may exit the dielectric tube 120 via a plasma jet outlet.

The pulsing power supply 115 may be electrically coupled with the dielectric tube 120 and ground. An electrical potential may be produced between the dielectric tube 120 and aground. This electrical potential, for example, may create the plasma 110 by ionizing the gas introduced through the gas inlet port 108.

Note that these illustrations are representative and do not include all incarnations of particular dielectric barrier discharges. Plasma jets may be driven with direct current (DC), pulsed DC, kilohertz-frequency alternating current (AC), radio-frequency power, and/or a pulsing power supply. In some embodiments, a dialectic barrier discharge device may operate without any DC current flowing between the two electrodes.

The pulsing power supply 115, for example, may include any device that can produce an electric potential within a thruster system that can be used to create a plasma from gas introduced within the thruster. The pulsing power supply 115 may include the pulsing power supply 800 shown in FIG. 8.

The pulsing power supply 115, for example, may include a nanosecond pulser. The pulsing power supply 115 may create electrical pulses with one or more of the following characteristics: a voltage greater than 5 kV, a pulse repetition frequency greater than 10 kHz, a rise time less than 100 ns, and/or a pulse width less than about 500 ns, etc. In some embodiments, the pulsing power supply 115 may have an inductance less than 100 nH and/or a capacitance less than 10 nF.

Different electrode configurations and/or driving power supplies may allow for different plasma properties. In some embodiments, the temperature of the plasma plume may depend on the type of driving pulsing power supply and/or the mode of operation. In some embodiments, both electrodes can be completely insulated from the plasma by the dielectric tube (e.g., as shown in FIG. 1B). In the double ring electrode configuration shown in FIG. 1B, for example, the electrode system may be completely protected and degradation of electrodes during dielectric barrier discharge operation may not be a concern. In some embodiments, the larger dielectric gap may impose the requirement of higher voltage operation for the power system to achieve the necessary electric field strength for proper dielectric barrier discharge operation.

Some embodiments may include a pulsing power supply and a ring electrode dielectric barrier discharge device.

Figure 2A:
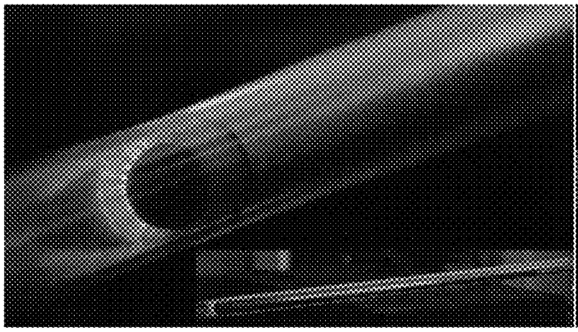
FIG. 2A is a photograph of an example dielectric barrier discharge device that can generate a one meter long dielectric barrier discharge in air.

In some embodiments, a pulsing power supply can be used to generate dielectric barrier discharge plasmas in a wide range of thruster configurations. FIG. 2A illustrates a dielectric barrier discharge device, which can produce a plasma that is, for example, one meter long dielectric barrier discharge in air and/or demonstrates the power system's ability to generate high peak power levels. In this example, the diameter of the thruster can be approximately 25 mm and the capacitance of the thruster may be approximately 100 pF yet produce fast rise times at high pulse repetition frequencies. The dielectric barrier discharge configuration shown in FIG. 2A may include an electrode arrangement which produces an atmospheric plasma that can be used, for example, in surface treatment of materials and for medical device applications.

Figure 2B:
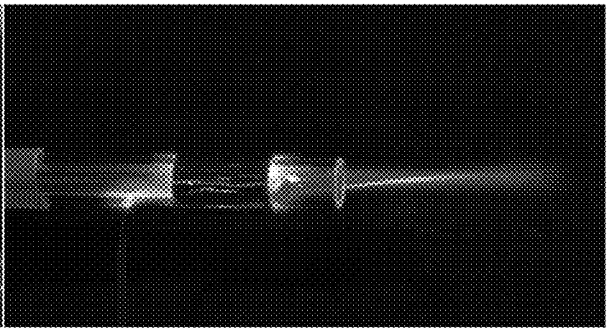
FIG. 2B is a photograph of a dielectric barrier discharge-like device with flowing helium gas.

FIG. 2B illustrates a dielectric barrier discharge device with flowing helium gas. In this example the tube diameter is approximately 6 mm and the jet extends approximately 25 mm from the quartz tube.

In some embodiments, any type of plasma jet may be used, such as, for example, H a dielectric free electrode jet, dielectric barrier discharge device, dielectric barrier discharge-like jet, and a single electrode jet.

Figure 3A:
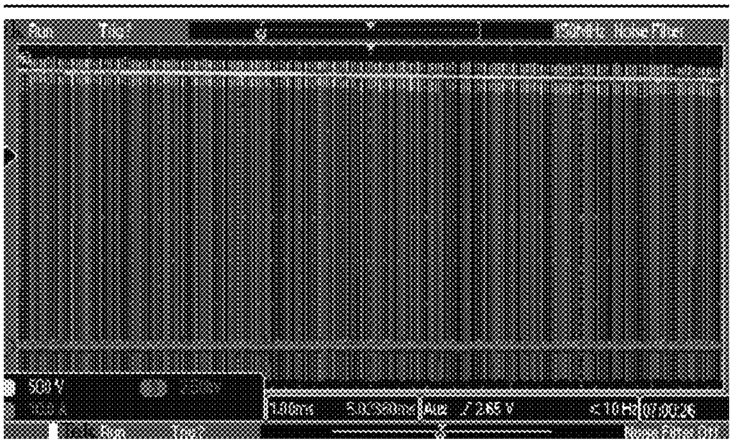
FIG. 3A illustrates a continuous wave operation of a pulsing power supply driving a dielectric barrier discharge device with 20 kV pulses having a 40 ns pulse width and a 20 kHz Pulse Repetition Frequency (PRF) according to some embodiments.
Figure 3B:
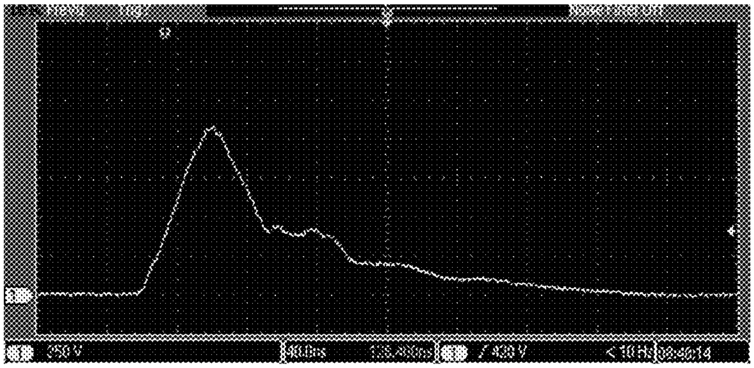
FIG. 3B illustrates a graph of a pulsing power supply near minimum with a 40 ns pulse widths for 20 kV operation.
Figure 3C:
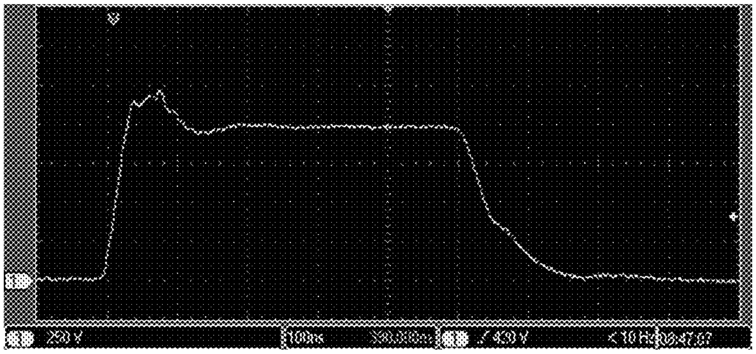
FIG. 3C illustrates a graph of a pulsing power supply near maximum with a 500 ns pulse widths for 20 kV operation.

In some embodiments, such a pulsing power supply may be used with any one of a variety of loads such as, for example, several dielectric barrier discharge devices, while the output voltage is monitored. FIG. 3A illustrates an output voltage (purple) of an example pulsing power supply during continuous wave operation with 5 kV pulses (40 ns PW) at 20 kHz PRF. In some embodiments, the pulsing power supply can be run in single pulse, burst, or continuous wave modes. FIG. 3B and FIG. 3C show the output voltage of an example pulsing power supply, while driving a dielectric barrier discharge device with 30 pF of capacitance. In this example, the output voltage was 5 kV, which was measured using a high voltage differential probe and (20:1) voltage divider. The pulses shown in FIG. 3B have a pulse width of 40 ns. The pulses shown in FIG. 3C have a pulse width of 500 ns. In some embodiments, the pulse width of a pulsing power supply may be variable. For example, the pulse width may be controlled by a user (e.g., via a user interface or front panel) or by a computer system.

Figure 4A:
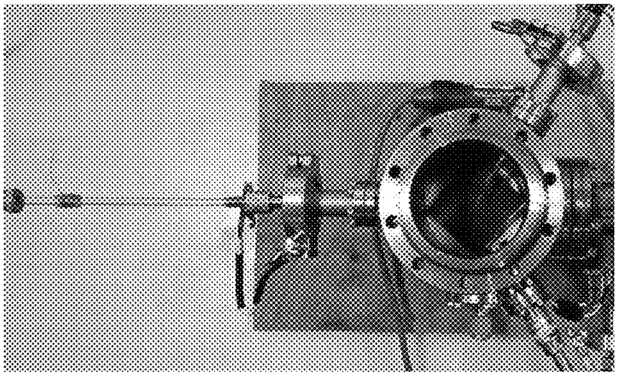
FIG. 4A illustrates an example dielectric barrier discharge device and vacuum system.

FIG. 4A is a photograph of the dielectric barrier discharge device connected to a vacuum chamber shown in FIG. 1B.

Figure 4B:
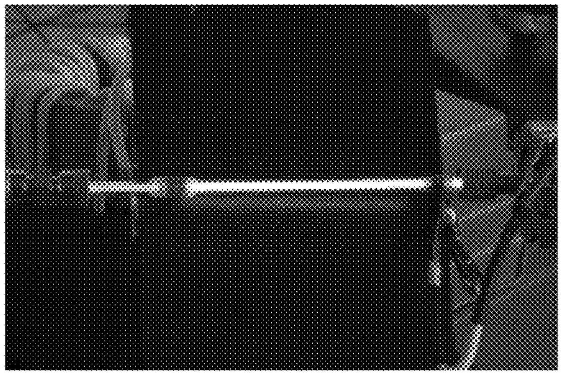
FIG. 4B illustrates thruster electrodes and a quartz tube in operation with helium.

FIG. 4B is a photograph of thruster having thruster electrodes and a quartz tube in operation with helium. The dielectric barrier discharge device shown in FIGS. 4A and 4B, may be driven using a pulsing power supply such as, for example, the pulsing power supply described in FIG. 8. In some embodiments, the pulsing power supply may be capable of 1 kW average output power supplied to a thruster. In some embodiments, a pulsing power supply may provide 10 to 200 W continuous wave power to a thruster.

In some embodiments, a thruster may include a quarter inch diameter quartz tube and copper tape for the ring electrodes. In some embodiments, the pulsing power supply power may be solid state with wall power efficiency of greater than 70%. In some embodiments, the thruster electrodes may be operated outside a vacuum system and/or may be movable to allow varying distances between electrodes. In some embodiments, the gas flow through the quartz tube may be controlled using a standard regulator connected to a gas cylinder. Any type of gas can be used such as, for example, helium, hydrogen, argon, krypton, xenon, nitrogen, oxygen, etc. In some embodiments, a flow rate may be calculated or estimated using known chamber pressure, volume and/or pumping conductance. In some embodiments, the vacuum chamber may be pumped using a scroll pump with base pressure at a low flow rate such as, for example, in the 30 mTorr range. In some embodiments, a thermocouple may be included as a diagnostic to determine heat flux to the probe surface as a rough proxy to determine plasma/gas heating performance. In some embodiments, the gas flow through the tube may be controlled using a flow control techniques such as, for example, using regulators, mass flow controllers, etc.

In some embodiments, a thruster according to some embodiments may operate at low flow rates such as, for example, less than 100,100 SCCM, 50,000 SCCM, 25,000 SCCM, 15,000 SCCM, 10,000 SCCM, 5,000 SCCM, 2,500 SCCM, 1,000 SCCM, 500 SCCM, 100 SCCM, 50 SCCM, 25 SCCM, 15 SCCM, 10 SCCM, 5 SCCM, etc. In some embodiments, a thruster according to some embodiments may operate at low pressures down stream of the thruster such as, for example, less than about 100 mTorr, 50 mTorr, 25 mTorr, 15 mTorr, 10 mTorr, 5 mTorr, etc. in the space environment or the vacuum of space.

In some embodiments, operation at these conditions may exhibit plasma performance that may be similar to high specific impulse electric propulsion systems. In some embodiments, at higher flow rates a transition to a different mode may occur. This different mode, for example, may be similar to or be an electro-thermal thruster. In some embodiments, this different mode may be more electro-thermal in nature, and/or may produce high thrust at lower specific impulse. FIG. 5 shows photos of the plasma jets produced by the dielectric barrier discharge device at different flow rates.

Figure 5A:
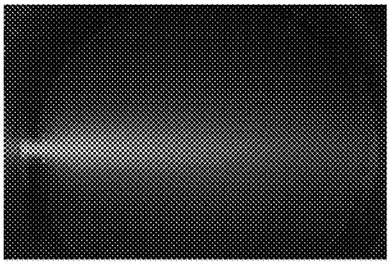
FIGS. 5A-5F are a top down photo of a dielectric barrier discharge device at the exit of the nozzle entering into the vacuum chamber at various flow rates according to some embodiments.
Figure 5B:
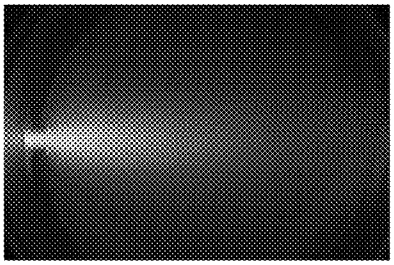
Figure 5C:
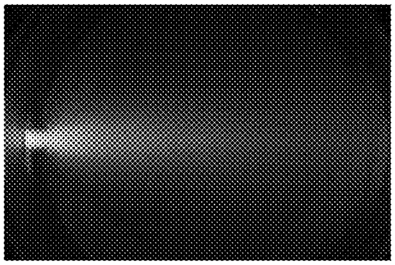
Figure 5D:
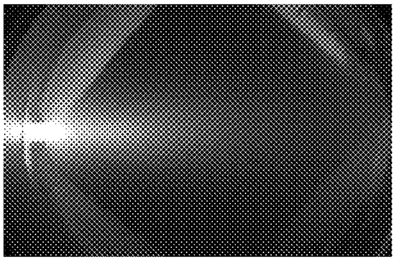
Figure 5E:
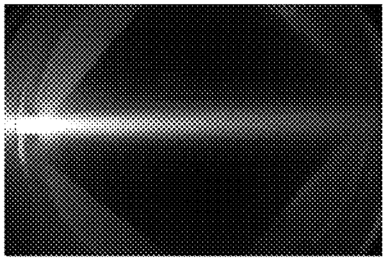
Figure 5F:
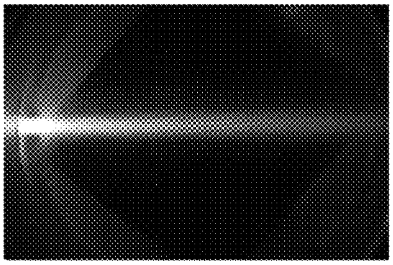

FIG. 5A is a top down photo of a dielectric barrier discharge device at the exit of the nozzle entering into the vacuum chamber at a flow rate of 14 SCCM. FIG. 5B is a top down photo of a dielectric barrier discharge device at the exit of the nozzle entering into the vacuum chamber at flow rate of 84 SCCM. FIG. 5C is a top down photo of a dielectric barrier discharge device at the exit of the nozzle entering into the vacuum chamber at a flow rate of 352 SCCM. FIG. 5D is a top down photo of a dielectric barrier discharge device at the exit of the nozzle entering into the vacuum chamber at a flow rate of 17,500 SCCM. FIG. 5E is a top down photo of a dielectric barrier discharge device at the exit of the nozzle entering into the vacuum chamber at a flow rate of 210,000 SCCM. FIG. 5F is a top down photo of a dielectric barrier discharge device at the exit of the nozzle entering into the vacuum chamber at flow rate of 840,000 SCCM.

As shown in FIGS. 5A-5E the plasma is very bright white at the lowest flow rates and changes to red emission due to neutral collision and excitation as He flow rates are increased. The gas used in the examples shown in FIGS. 5A-5F is Helium.

In the examples shown in FIGS. 5A-5F, the dielectric barrier discharge device can operate with a wide range of propellant flow. In these photographs the dielectric barrier discharge pulsing power supply was fixed at 8 kV, 200 ns pulse width, and a pulse repetition frequency of 20 kHz or greater. The visual appearance of the plasma progresses from a bright white/blue to red suggesting highly ionized plasma can be created at low flow rates with embodiments described in this document with increasing neutral emission as flow rate is increased. Interestingly, the amount of power drawn from the pulsing power supply was 195 W for the lowest flow rate (FIG. 5A) and increased to 230 W (FIG. 5F) for the highest flow rate suggesting fairly constant input power over this range.

Figure 6:
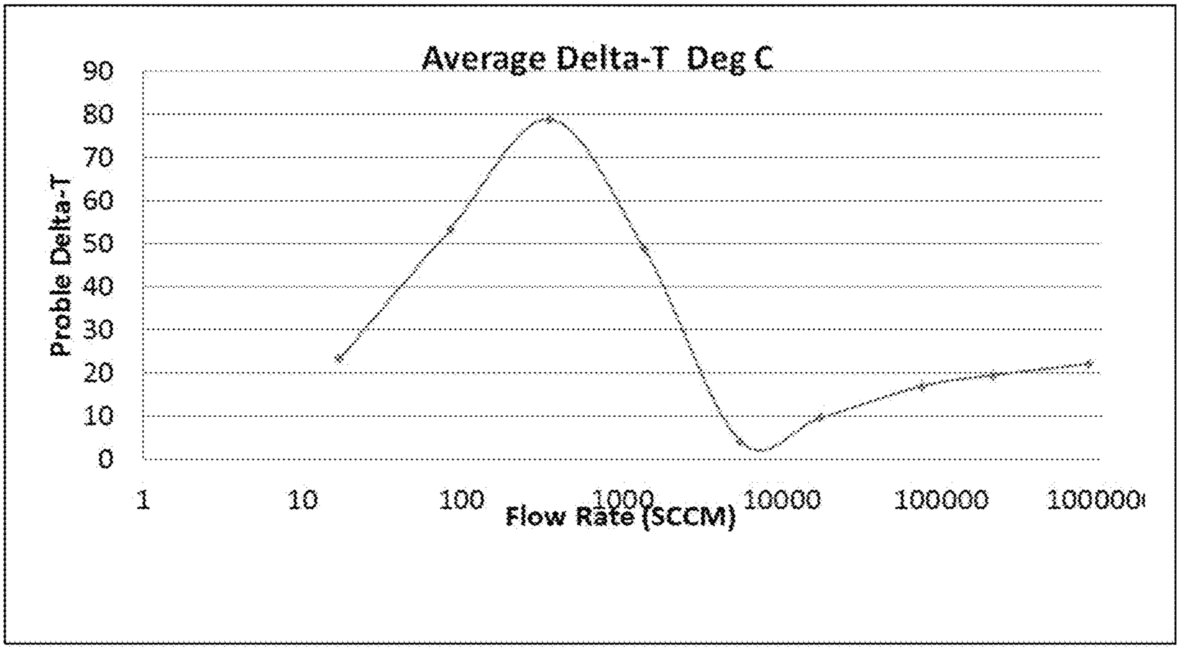
FIG. 6 is a plot of probe temperature as a function of flow rate for 0.5 second pulse operation.

In some embodiments, a single thermocouple may be used to measure the output heat flux to the probe at various flow rates. A plot of probe temperature as a function of flow rate for 0.5 second pulser operation is shown in FIG. 6. There are two regimes of operation as flow rate is increased. The largest ΔT is seen in the low flow regime and may, for example, be due to maximum plasma flux to the probe surface. As flow rate and the corresponding background pressure (e.g., due to limited pumping capability) is increased, the ΔT falls rapidly with almost no change in temperature seen on the probe near 10,000 SCCM. At the highest flow rates temperatures seem to asymptote to a constant level. At the highest flow rates the background chamber pressure is quite high (e.g., greater than 10 Torr). Continued probe heating after the 1000 SCCM point suggests the dielectric barrier discharge device may operate in the electro-thermal regime and contributing to increased heating over the cold gas exiting the nozzle alone. Some embodiments may operate a thruster system with flow rates below 500 SCCM.

Assuming a half cone angle of 45° for the plume, the heat energy deposited in the thermocouple can be scaled to the total of the average power in the plume (e.g., 166 W). The mass flow rate is known. In this example, the specific impulse is 1820 seconds; the thrust is 18.2 mN; and wall power efficiency is ~60%. In some embodiments, the thrust of a higher mass flow rate may be higher while having a lower specific impulse.

Figure 7A:
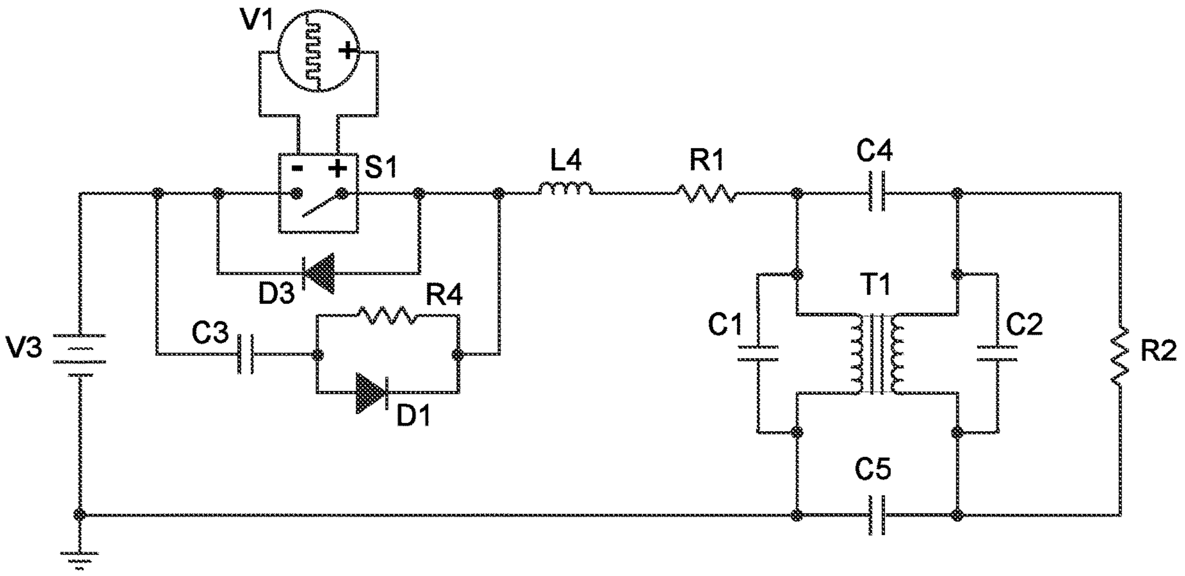
FIG. 7A illustrates a pulsing power supply circuit according to some embodiments.
Figure 7B:
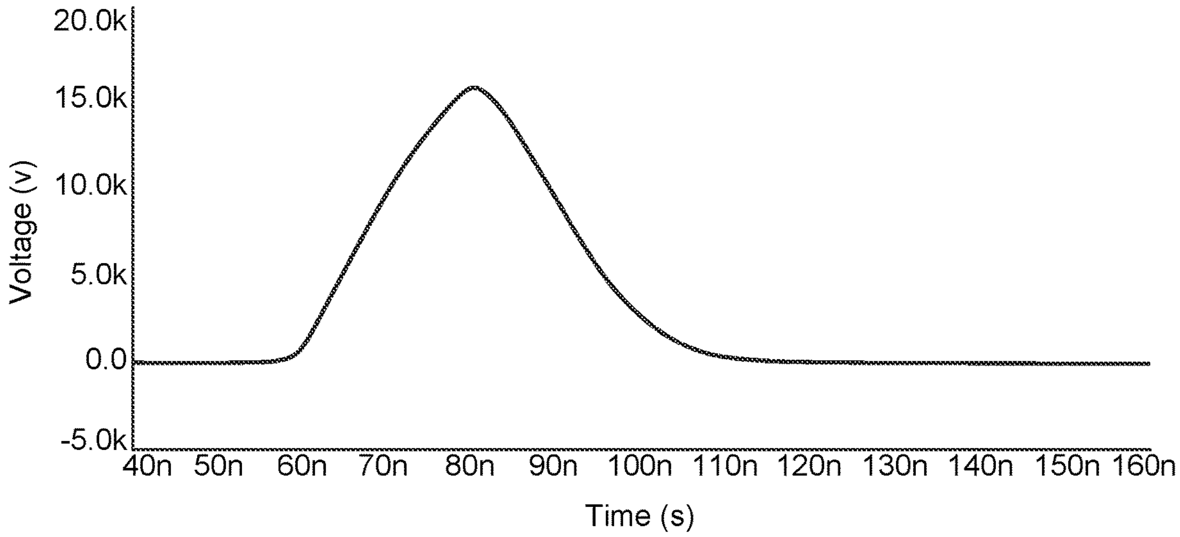
FIG. 7B is a graph of voltage vs. time of an output pulse of a pulsing power supply.

FIG. 7A illustrates a pulsing power supply circuit according to some embodiments. FIG. 7B is a graph of voltage vs. time of an output pulse of a pulsing power supply.

Figure 8:
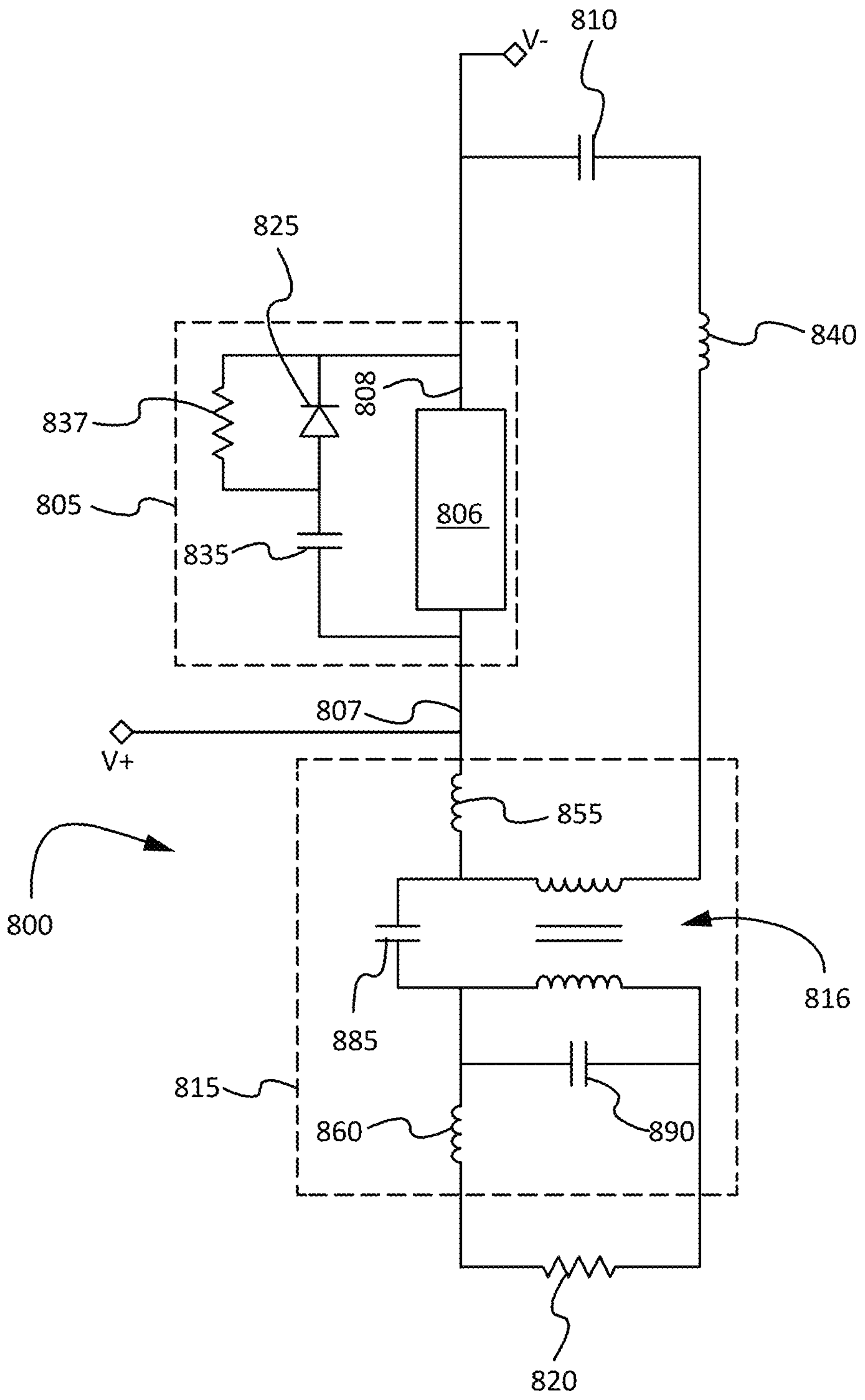
FIG. 8 illustrates an example circuit diagram of a pulsing power supply according to some embodiments.

FIG. 8 illustrates an example circuit diagram of a pulsing power supply 800 according to some embodiments. The pulsing power supply 800 may include one or more switch modules 805 that may include a switch 806, a snubber resistor 837, a snubber capacitor 835, a snubber diode 825, or some combination thereof. In some embodiments, the snubber capacitor 835 and the snubber diode 825 may be arranged in series with each other and together in parallel with the switch 806. The snubber resistor 837, for example, may be arranged in parallel with the snubber diode 825.

The switch 806 may include any solid state switching device that can switch high voltages such as, for example, a solid state switch, an IGBT, an FET, a MOSFET, a SiC junction transistor, or a similar device. The switch 806 may include a collector 807 and an emitter 808. Various other components may be included with the switch module 805 in conjunction with the switch 806. A plurality of switch modules 805 in parallel, in series, or some combination thereof may be coupled with the transformer module 815. In some embodiments, the switch 806 may include a freewheeling diode.

The switch module 805 may be coupled with or may include a fast capacitor 810, which may be used for energy storage. In some embodiments, more than one switch module 805 may be coupled with a single fast capacitor 810. In some embodiments, the fast capacitor 810 may be an energy storage capacitor. The fast capacitor 810 may have a capacitance value of about 8 μF, about 5 μF, between about 8 μF and about 5 μF, between about 800 nF and about 8,000 nF etc.

During switching of the switch 806, the energy in the fast capacitor 810 may be discharged to the primary winding of the transformer 816. Moreover, in some embodiments, the energy within the fast capacitor 810 may not be substantially drained during each switch cycle, which may allow for a higher pulse repetition frequency. For example, in one switch cycle 5%-50% of the energy stored within the fast capacitor 810 may be drained. As another example, in one switch cycle 80%-40% of the energy stored within the fast capacitor 810 may be drained. As yet another example, in one switch cycle 8%-5% of the energy stored within the fast capacitor 810 may be drained.

The switch module 805 and the fast capacitor 810 may be coupled with a transformer module 815. The transformer module 815, for example, may include a transformer 816, capacitors, inductors, resistors, other devices, or some combination thereof. The transformer 816 may include a toroid shaped core with a plurality of primary windings and a plurality of secondary windings wound around the core. In some embodiments, there may be more primary windings than secondary windings. The secondary windings may be coupled with the load 820 or an output that may be configured to couple with the load 820.

In some embodiments, the load 820 may include one or more resistor, capacitor, inductor, electrode, dielectric barrier discharge, spark discharge, dielectric tube, etc.

The transformer module 815 may include stray capacitance and/or stray inductance. Stray capacitor 885 represents the transformer primary to secondary stray capacitance. Stray capacitor 890 represents the transformer secondary stray capacitance. Inductor 855 represents the primary stray inductance of the transformer, and inductor 860 represents the secondary stray inductance of the transformer.

In some embodiments, the transformer 816 may include a toroid shaped core comprised of air, iron, ferrite, soft ferrite, MnZn, NiZn, hard ferrite, powder, nickel-iron alloys, amorphous metal, glassy metal, or some combination thereof. In some embodiments one or more cores may be used.

In some embodiments, the transformer primary to secondary stray capacitance and/or the transformer secondary stray capacitance may be below about 1 pF, below about 100 pF, about 10 pF, about 20 pF, etc. In some embodiments, the sum of the secondary stray capacitance and the primary stray capacitance may be less than about 10 pF, 50 pF, 75 pF, 100 pF, 125 pF, 135 pF, etc.

In some embodiments, the secondary stray inductance of the transformer and/or the primary stray inductance of the transformer may have an inductance value, for example, of less than 1 nH, 2 nH, 5 nH, 10 nH, 20 nH, between about 1 nH and 1,000 nH, less than about 100 nH, less than about 500 nH, etc.

In some embodiments, a pulsing power supply may be designed with low stray capacitance. For example, the sum of all stray capacitance within the pulsing power supply may be below 500 pF. This may include transformer module stray capacitance, switch module stray capacitance, other stray capacitance, or some combination thereof.

In some embodiments, the primary windings of the transformer 816 can include a plurality of single windings. For example, each of the primary windings may include a single wire that wraps around at least a substantial portion of the toroid shaped core and terminate on either side of the core. As another example, one end of the primary windings may terminate at the collector 807 of the switch 806 and another end of the primary windings may terminate at the fast capacitor 810. Any number of primary windings in series or in parallel may be used depending on the application. For example, about 1, 2, 5, 8, 10, 20, 40, 50, 100, 116, 200, 250, 100, etc. or more windings may be used for the primary winding.

In some embodiments, a single primary winding may be coupled with a single switch module 805. In some embodiments, a plurality of switch modules 805 may be included and each of the plurality of switch modules 805 may be coupled with one of a plurality of primary windings. The plurality of windings may be arranged in parallel about the core of the transformer 816. In some embodiments, this arrangement may be used to reduce stray inductance in the pulsing power supply 800.

In some embodiments, the secondary winding may include wire wrapped around the core any number of times. For example, the secondary winding may include 5, 10, 20, 30, 40, 50, 100, etc. windings. In some embodiments, the secondary winding may wrap around the core of the transformer and through portions of the circuit board. For example, the core may be positioned on the circuit board with a plurality of slots in the circuit board arranged axially around the outside of the core and an interior slot in the circuit board positioned in the center of the toroid shaped core. The secondary winding may wrap around the toroid shaped core and wrap through slots and the interior slot. The secondary winding may include high voltage wire.

In some embodiments, the thruster system may include an electro-thermal thruster. An electro-thermal thruster, for example, may include one or more arrays of micro-fabricated electrode/nozzles from 100 to 300 μm in diameter. In some embodiments, the electrodes are coated with a layer of aluminum oxide to form a dielectric layer over the electrodes. This effectively makes a miniature dielectric barrier discharge device. Various other thrusters, plasma thrusters, and/or electronic propulsion devices may be used.

Some embodiments may include a thruster system that comprises a cold gas thruster and a dielectric barrier discharge device. In some embodiments, the dielectric barrier discharge device may be added to a system with a cold gas thruster to produce thrust in addition to the thrust provided by the cold gas thruster. The combination of a cold gas thruster and a thruster system of the various embodiments described in this document may provide a system that can operate from low to high flow rates and/or or low to high thrust levels that may vary depending on application.

The term "substantially" means within 5% or 10% of the value referred to or within manufacturing tolerances.

Numerous specific details are set forth to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. A thruster system comprising:

a thruster comprising:

a gas inlet port;

a plasma jet outlet;

a first electrode; and a pulsing power supply comprising a plurality of solid-state switches, the pulsing power supply electrically coupled with the first electrode, the pulsing power supply providing an electrical potential to the first electrode with a pulse repetition frequency greater than 10 kHz, and, a voltage greater than 5 kilovolts, wherein a downstream gas pressure is less than 10 Torr, wherein a plasma is produced within the thruster by energizing a gas flowing into the thruster through the gas inlet port from an electric field created by pulsing the pulsing power supply through the first electrode, and the plasma is expelled from the thruster through the plasma jet outlet.

2. The thruster system according to claim 1, wherein the plurality of solid-state switches comprises a plurality of IGBTs and a transformer.

3. The thruster system according to claim 1, wherein the pulsing power supply has a total inductance less than 100 nH.

4. The thruster system according to claim 1, wherein the pulsing power supply has a capacitance less than 100 pF.

5. The thruster system according to claim 1, wherein the pulsing power supply is configured to produce variable pulse widths between 20 to 500 nanoseconds.

6. The thruster system according to claim 1, wherein the pulsing power supply provides the electrical potential with rise times less than 100 nanoseconds.

7. The thruster system according to claim 1, wherein the pulsing power supply provides the electrical potential with a pulse width less than 500 nanoseconds.

8. The thruster system according to claim 1, wherein the thruster is selected from a group consisting of a dielectric free electrode thruster, a dielectric barrier discharge device and a single electrode thruster.

9. The thruster system according to claim 1, wherein the pulsing power supply is configured to produce controllable pulse widths between 20 to 500 nanoseconds.

10. The thruster system according to claim 1, wherein the first electrode comprises a ring electrode.

11. The thruster system according to claim 10, further comprising a second ring electrode electrically coupled with the pulsing power supply.

12. The thruster system according to claim 1, wherein the pulsing power supply comprises a dielectric tube.

13. The thruster system according to claim 1, wherein the first electrode comprises a tube electrode.

14. The thruster system according to claim 1, wherein the thruster comprises a dielectric tube that includes the gas inlet port and the plasma jet outlet; and wherein the first electrode comprises a ring electrode surrounding the dielectric tube, the thruster further comprising a second ring electrode, wherein the second ring electrode is electrically coupled with the pulsing power supply.

15. The thruster system according to claim 1, wherein the pulsing power supply produces the plasma at input propellant flow rates of less than 50,000 SCCM.

16. The thruster system according to claim 1, wherein the pulsing power supply is configured to produce a current output up to 200 A.

17. A thruster system comprising:

a dielectric barrier discharge thruster comprising:

a dielectric tube;

a gas inlet port that introduces a gas into the dielectric tube;

a first ring electrode, a second electrode; and a pulsing power supply electrically coupled with the first ring electrode and the second electrode, the pulsing power supply producing electrical pulses having a pulse width less than 500 nanoseconds, and a voltage less than 5 kV, wherein the electrical pulses produce an electric potential between the first ring electrode and the second electrode that ionizes the gas within the dielectric tube.

18. The thruster according to claim 17, wherein the second electrode is second ring electrode.

19. A thruster system comprising:

a thruster comprising:

a gas inlet port;

a plasma jet outlet;

a first electrode;

a second electrode; and a pulsing power supply electrically coupled with the first electrode and the second electrode, the pulsing power supply comprising a plurality of switches that produces electric pulses greater than 5 kilovolts and with rise times less than 100 nanoseconds;

wherein a plasma is produced within the thruster by energizing a gas flowing into the thruster through the gas inlet port from an electric field created by pulsing the pulsing power supply through the first electrode and/or the second electrode, wherein a flow rate of the gas is less than 50,000 SCCM, and wherein the plasma is expelled from the thruster through the plasma jet outlet.

20. The thruster system according to claim 19, wherein the pulsing power supply comprises a transformer electrically coupled with the plurality of switches having a primary and a secondary such that the primary has a primary inductance less than 100 nH and a primary to secondary stray capacitance less than 200 pF.

* * * * *